G. SMITH.
CLEAT FOR TRACTOR WHEELS.
APPLICATION FILED MAY 6, 1919.
1,315,873.
Patented Sept. 9, 1919.
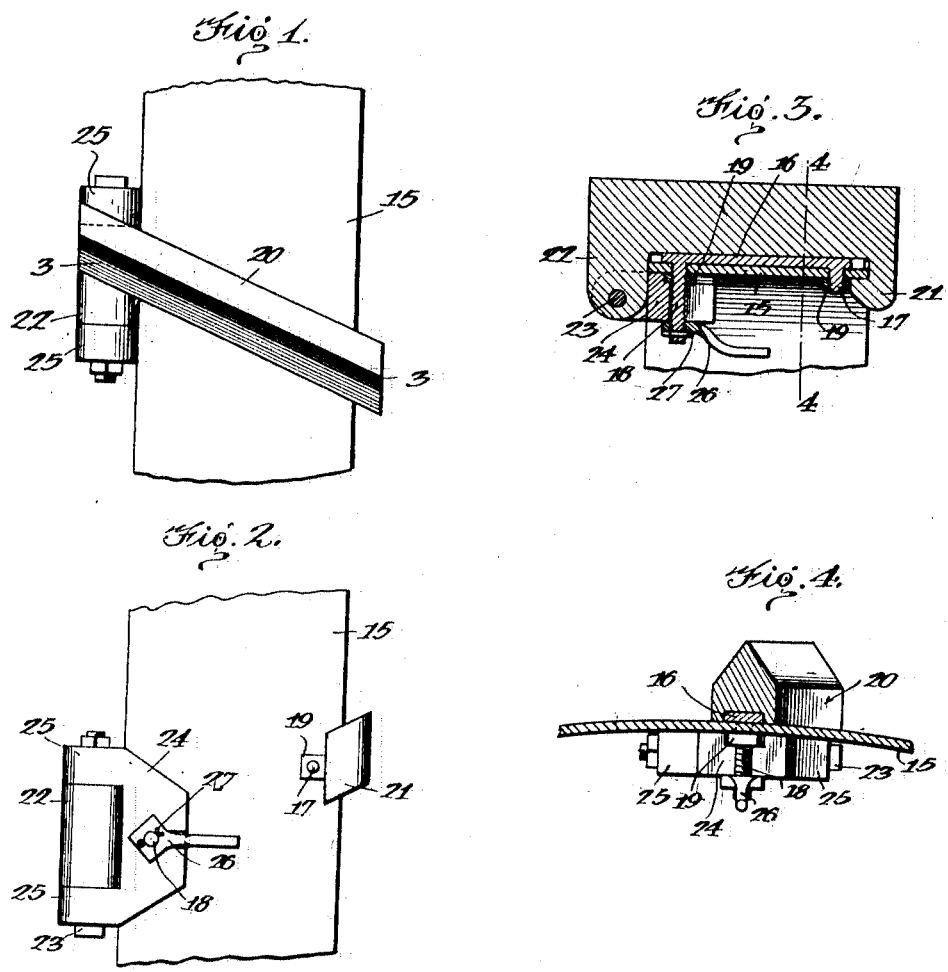
George Smith.
INVENTOR
BY
ATTORNEYS

UNITED STATES PATENT OFFICE.

GEORGE SMITH, OF WESTALTON, MISSOURI.

CLEAT FOR TRACTOR-WHEELS.

1,315,873.  Specification of Letters Patent.  Patented Sept. 9, 1919.

Application filed May 6, 1919. Serial No. 295,180.

*To all whom it may concern:*

Be it known that I, GEORGE SMITH, a citizen of the United States, and a resident of Westalton, in the county of Saint Charles and State of Missouri, have made certain new and useful Improvements in Cleats for Tractor-Wheels, of which the following is a specification.

My present invention relates generally to the wheels of tractors and the like employing traction wheels having broad flat fellies, and more particularly to a cleat for use therewith, the purpose of which is to secure a better traction or tractive grip with the surface of the ground, my object being the provision of a quick detachable cleat for use in soft ground to supplement the ordinary highway cleats employed with wheels of this nature.

A further object of the invention is the provision of a cleat which may be readily and quickly secured in place, and is readily and quickly detached.

In the accompanying drawing illustrating my present invention:—

Figure 1 is a top plan view of the cleat in operative connection with a portion of the tread of a wheel;

Fig. 2 is a bottom plan view;

Fig. 3 is a cross section taken substantially on line 3—3 of Fig. 1;

Fig. 4 is a longitudinal section taken substantially on line 4—4 of Fig. 3.

Referring now to these figures, I have shown a portion of the flat annular tread of a tractor or other wheel at 15 in the several figures, which, as seen particularly in Fig. 3, has an angularly disposed flat highway cleat 16 extending across the same upon its outer surface and provided with threaded stems 17 and 18 projecting inwardly through openings in the tread 15 for the reception of nuts 19 against the inner surface of the said tread, in order to hold the highway cleat in position.

In accordance with my invention, however, one of the threaded stems namely, the threaded stem 18, is considerably elongated inwardly beyond tread 15 of the wheel to assist in a manner to be presently described in the securing of a quick detachable cleat of greatly increased proportions with respect to the highway cleat 16, and in connection with the latter.

This cleat consists of a cross bar 20 which may have along its inner face a groove receiving the highway cleat 16, as best seen in Fig. 4, so that its inner side portions may seat flatwise against the surface of the wheel tread 15, and the outer portions of which bar 20 may be oppositely beveled as shown, so as to present an outer engaging edge for the purpose of providing effective traction in connection with soft ground.

The cleat 20 is provided at one end with an inturned hook extension 21 for engagement with the wheel tread 15 at one side, and has an angular extension 22 at its opposite end, the latter of which has an opening for the reception of a bolt 23. This bolt forms a hinged connection between the respective end of the cleat 20, and a clamping piece 24, through the apertured outer portions 25 of which the bolt extends, the opposite end of which clamping block 24 has a slot to receive the inwardly extended pin 18 so as to provide for the use of a hand nut 26 upon the inner end of said inner pin to secure the clamping block in position, a cotter pin or the like being also preferably passed through a transverse opening in the free end of the threaded pin to hold the hand nut 26 in position.

Thus in applying the cleat it is simply necessary to engage its hooked end 21 at one side of the tread band and rock the body of the cleat downwardly onto the highway cleat 16, after which the clamping block 24 may be swung against the inner surface of the wheel tread to receive the pin 18 in its slot. The hand nut 26 is then applied and screwed tight after which the cotter pin 27 is placed in position and the emergency cleat is then completely connected for use. This is obviously a simple quick operation, which may be completed without the use of special tools or implements to securely fasten the emergency cleat in position in such manner that it may be just as readily and quickly removed.

I claim:—

1. The combination with the flat tread of a wheel, of a flat cleat upon the outer surface of the tread having threaded stems projecting inwardly through the said tread, and a quick detachable cleat arranged to fit over the first mentioned cleat having a hook at one end for engagement with the tread at one side and having an inwardly projecting angular extension at its opposite end, a clamping block hingedly connected to the said angular extension, and movable against the inner surface of the wheel tread, said clamping block having a slot receiving one of the said threaded pins of the first named cleat, and a nut threaded on the stem and engageable with the clamping block to secure the latter in position.

2. A quick detachable cleat for use in connection with traction wheel treads having cleats provided with threaded stems projecting inwardly beyond the tread, consisting of a cross bar having a hook at one end for engagement with one side of the tread and having an inwardly projecting angular extension at the opposite end arranged at the relatively opposite side of the tread, and a clamping block detachably connected to the said angular extension of the cross bar and apertured to receive one of the said inwardly projecting threaded stems for the purpose described.

GEORGE SMITH.

Copies of this patent may be obtained for five cents each, by addressing the "Commissioner of Patents, Washington, D. C."